US012549882B2

(12) United States Patent
Kim

(10) Patent No.: US 12,549,882 B2
(45) Date of Patent: Feb. 10, 2026

(54) EAR DEVICE AND WEARABLE ELECTRONIC DEVICE INCLUDING THE SAME

(71) Applicant: SAMSUNG ELECTRONICS CO., LTD., Suwon-si (KR)

(72) Inventor: Kiwon Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 462 days.

(21) Appl. No.: 18/317,939

(22) Filed: May 16, 2023

(65) Prior Publication Data

US 2023/0412959 A1 Dec. 21, 2023

Related U.S. Application Data

(63) Continuation of application No. PCT/KR2023/004355, filed on Mar. 31, 2023.

(30) Foreign Application Priority Data

Jun. 15, 2022 (KR) ........................ 10-2022-0072896
Jul. 13, 2022 (KR) ........................ 10-2022-0086217

(51) Int. Cl.
*H04R 1/10* (2006.01)

(52) U.S. Cl.
CPC ......... *H04R 1/1016* (2013.01); *H04R 1/1058* (2013.01); *H04R 1/1041* (2013.01); *H04R 2420/07* (2013.01)

(58) Field of Classification Search
CPC ...... H04R 1/10; H04R 1/1016; H04R 1/1066; H04R 25/60; H04R 25/652; H04R 25/656;

(Continued)

(56) References Cited

U.S. PATENT DOCUMENTS 2,344,023 A * 3/1944 Carlisle ................ H04R 25/652 381/328
8,270,657 B2 * 9/2012 Takigawa ............. H04R 1/1041 381/372

(Continued)

FOREIGN PATENT DOCUMENTS

EP 2355549 A1 * 8/2011 ........... H04R 25/609
JP 8-98290 A 4/1996

(Continued)

OTHER PUBLICATIONS

International Search Report mailed Jul. 5, 2023 for PCT/KR2023/004355. In conformance with MPEP 609—Concise explanation of the relevance includes issue date of a foreign OA and references cited therein.

*Primary Examiner* — Ryan Robinson
(74) *Attorney, Agent, or Firm* — CANTOR COLBURN LLP

(57) ABSTRACT

A wearable electronic device including an ear device is disclosed. The wearable electronic device includes an earpiece configured to convert an electrical signal into a sound signal, and an ear device configured to be connected to the earpiece. The ear device includes a first tip member configured to be connected to the earpiece, a second tip member configured to surround at least a portion of the first tip member, and a guide ring configured to be interposed between at least a portion of the first tip member and at least a portion of the second tip member, the guide ring is formed of an elastic material and is movable between a first end portion of the first tip member connected to the earpiece and a second end portion positioned on a side opposite to the first end portion.

22 Claims, 19 Drawing Sheets

(58) Field of Classification Search
CPC .......... H04R 2201/10; H04R 2225/025; H04R 2225/77
See application file for complete search history.

(56) References Cited

U.S. PATENT DOCUMENTS

| | | | | |
|---|---|---|---|---|
| 9,930,454 | B2 * | 3/2018 | van'T Hof | H04R 25/30 |
| 10,440,458 | B2 * | 10/2019 | Basseas | H04R 1/1016 |
| 10,652,643 | B2 * | 5/2020 | Lin | H04R 1/1016 |
| 10,986,433 | B2 * | 4/2021 | McIntosh | E05F 1/1261 |
| 11,343,606 | B2 * | 5/2022 | Roberts | H04R 1/1033 |
| 2013/0004011 | A1 | 1/2013 | Hayashida et al. | |
| 2013/0092470 | A1 * | 4/2013 | Johnston | H04R 1/1016 181/129 |

FOREIGN PATENT DOCUMENTS

| | | | | |
|---|---|---|---|---|
| KR | 101411380 | B1 * | 6/2014 | H04R 1/105 |
| KR | 10-1473474 | B1 | 1/2015 | |
| KR | 10-1484182 | B1 | 1/2015 | |
| KR | 101494487 | B1 | 2/2015 | |
| KR | 20210111453 | A | 9/2021 | |

* cited by examiner

EAR DEVICE AND WEARABLE ELECTRONIC DEVICE INCLUDING THE SAME

CROSS-REFERENCE TO RELATED APPLICATIONS

This application is a bypass continuation application of International Application No. PCT/KR2023/004355 designating the United States, filed on Mar. 31, 2023, in the Korean Intellectual Property Receiving Office and claiming priority to Korean Patent Application No. 10-2022-0072896, filed on Jun. 15, 2022 and Korean Patent Application No. 10-2022-0086217, filed on Jul. 13, 2022, in the Korean Intellectual Property Office, the disclosures of which are incorporated by reference herein in their entireties.

BACKGROUND

1. Field

The disclosure relates to an ear device and a wearable electronic device including the same.

2. Description of Related Art

A wearable device is composed of a main body and a wearable portion, and may be worn on various parts of the human body according to a configuration of the wearable portion. For example, at the various parts of the human body, sound information may be obtained through the wearable electronic device worn on the ear.

SUMMARY

According to an embodiment, an ear device capable of being used under various physical conditions of a user to ensure efficient sound performance without a deterioration in sound quality, and a wearable electronic device including the same may be provided.

According to an embodiment, an ear device capable of changing a size with only a single ear device and fastening with an earpiece at a single operation without inconvenience of repeating the fastening and releasing multiple times, and a wearable electronic device including the same may be provided.

According to an embodiment, an ear device capable of reducing cost through cost reduction of materials and size reduction of a package and a wearable electronic device including the same may be provided.

According to an embodiment, a wearable electronic device includes: an earpiece configured to convert an electrical signal into a sound signal, and an ear device configured to be connected to the earpiece. The ear device includes a first tip member configured to be connected to the earpiece, a second tip member configured to surround at least a portion of the first tip member, and a guide ring configured to be interposed between at least a portion of the first tip member and at least a portion of the second tip member, the guide ring is formed of an elastic material and is movable between a first end portion of the first tip member connected to the earpiece and a second end portion of the first tip member opposite to the first end portion, an outer diameter of the first tip member decreases from the first end portion toward the second end portion, the first tip member is formed of a material having a greater hardness than the guide ring, and the guide ring is formed of a material having a greater hardness than the second tip member.

According to an embodiment, an ear device includes a first tip member including a first end portion configured to be connected to an earpiece configured to convert an electrical signal into a sound signal, a second tip member configured to surround at least a portion of the first tip member, and a guide ring interposed between at least a portion of the first tip member and at least a portion of the second tip member. The guide ring is formed of an elastic material and is movable between the first end portion of the first tip member and a second end portion of the first tip member opposite to the first end portion.

According to an embodiment, an ear device includes a first tip member, a second tip member configured to surround at least a portion of the first tip member, and a guide ring movably positioned between the first tip member and the second tip member and configured to move a partial area of the second tip member in a direction away from or a direction toward the first tip member. An outer diameter of the first tip member varies along a first direction perpendicular to a direction in which the second tip member is disposed on the first tip member.

According to an embodiment, it is possible to provide stable wearing comfort even under various physical conditions of users through multi-step size adjustment of the ear device.

According to an embodiment, since the size may be adjusted with only a single ear device, a plurality of ear devices having different sizes may not be provided unnecessarily.

According to an embodiment, since only a single ear device is provided, a product package space may be effectively reduced.

According to an embodiment, there is no risk of loss of an additionally provided ear device.

According to an embodiment, since only a single ear device is provided, an effect of cost reduction is exhibited.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
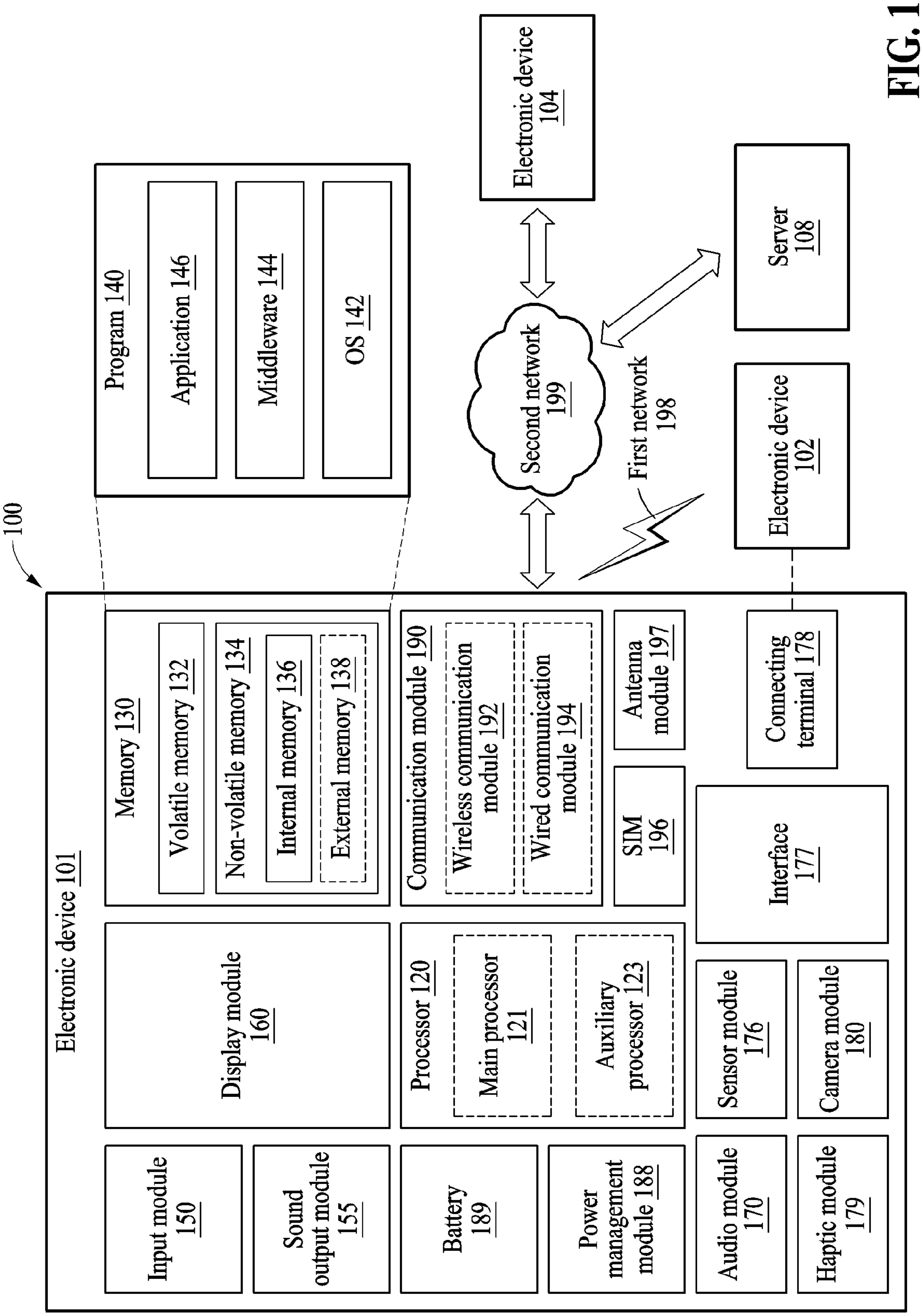
FIG. 1 is a block diagram illustrating an electronic device in a network environment according to an embodiment.

FIG. 1 is a block diagram illustrating an electronic device in a network environment according to an embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the above components may be omitted from the electronic device 101, or one or more other components may be added in the electronic device 101. In some examples, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjoint with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, or the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that one embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," may include any one of the items listed together in the corresponding one of the phrases, or all possible combinations thereof. Terms such as "$1^{st}$," and "$2^{nd}$," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with one embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-specific integrated circuit (ASIC).

An embodiment as set forth herein may be implemented as software (e.g., the program 140) including one or more of instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to one embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities, and some of the multiple entities may be separately disposed in different components. According to one embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to one embodiment, operations performed by the module, the program, or another component may be carried out sequentially, in parallel, repeatedly, or heuristically, or one or more of the operations may be executed in a different order or omitted, or one or more other operations may be added.

Figure 2:
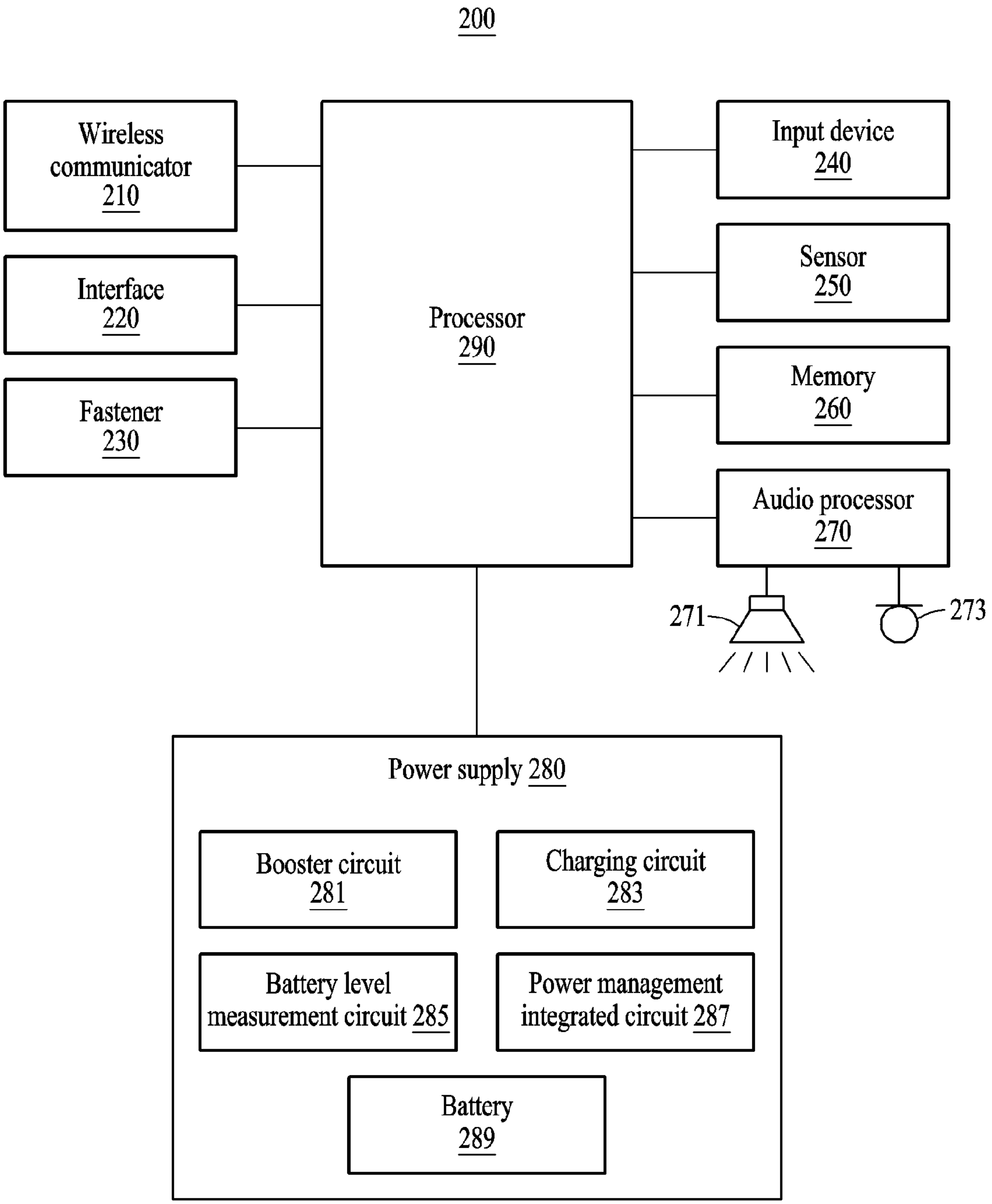
FIG. 2 is a block diagram of a wearable electronic device according to an embodiment.

FIG. 2 is a block diagram of a wearable electronic device according to an embodiment.

Referring to FIG. 2, a wearable electronic device according to an embodiment may include an earpiece 200. The earpiece 200 may be an electronic device (e.g., the electronic device 101 of FIG. 1) or a device capable of receiving charging power from a charging device or audio data and may include a device, such as an ear bud, earphone, or hearing electronic device, that is wearable on the ear of a user and may receive audio data.

In an embodiment, the earpiece 200 may be operable as a pair and may include a first earpiece that is wearable on one of the right and left ears of the user or a second earpiece that is wearable on the other one of right and left ears of the user.

In an embodiment, the earpiece 200 (e.g., the first earpiece) may include a wireless communicator 210, an interface 220, a fastener 230, an input device 240, a sensor 250, a memory 260, an audio processor 270, a power supply 280, and a processor 290.

In an embodiment, the wireless communicator 210 may include at least one communication module for communicating with an electronic device (e.g., the electronic device 101 of FIG. 1) or the other earpiece (e.g., the second earpiece). In an embodiment, the wireless communicator 210 may include a Bluetooth module for performing Bluetooth communication with the electronic device 101. In an embodiment, the wireless communicator 210 may include a Bluetooth low energy (BLE) module for performing BLE communication with the other earpiece. However, the wireless communicator 210 is not limited thereto, and the wireless communicator 210 may include other short-range communication (e.g., wireless fidelity (Wi-Fi), Zigbee, or near field communication (NFC)) module for communicating with an electronic device (e.g., the electronic device 101 of FIG. 1) or the other earpiece. In an embodiment, the wireless communicator 210 may include a communication module (e.g., a cellular communication module or the like) for communicatively connecting to an external device other than the electronic device (e.g., the electronic device 101 of FIG. 1) and the other earpiece.

In an embodiment, the interface 220 may perform wired communication with a cable capable of connecting the earpiece 200 and the electronic device (e.g., the electronic device 101 of FIG. 1) by wire, or may perform wired communication with a charging device for charging the earpiece 200 (or a battery 289 of the earpiece 200). In an embodiment, the wired communication may include at least one of a USB, an HDMI, recommended standard 232 (RS-232), or a plain old telephone service (POTS).

In an embodiment, the fastener 230 may fasten the earpiece 200 with the other earpiece. For example, the fastener 230 may include a magnet having a different magnetic polarity from a magnet included in the other earpiece. However, it is not limited thereto, and the fastener 230 may include components capable of fastening the earpiece 200 with the other earpiece, in addition to the magnet. In an embodiment, the fastener 230 may include a component capable of continuously maintaining a state where the earpiece 200 and the other earpiece have approached.

In an embodiment, the input device 240 may include a touch pad or a hard key (or a button) for receiving an input from a user.

In an embodiment, the sensor 250 may include a sensor for detecting whether the earpiece 200 is worn on the user's body (e.g., the ear). For example, the sensor 250 may include at least one of a heart rate monitoring (HRM) sensor, an electromyogram sensor, a temperature detection sensor, a proximity sensor, or a biosensor. In an embodiment, the sensor 250 may include a sensor for detecting a movement and position of the earpiece 200. For example, the sensor 250 may include at least one of an acceleration sensor, an angular velocity sensor, a global positioning system (GPS) sensor, or a rotation recognition sensor. In an embodiment, the sensor 250 may include a sensor for detecting whether the earpiece 200 is fastened with the other earpiece. For example, the sensor 250 may include a hall sensor for detecting a fastening of the fastener 230 (e.g., the magnet) of the earpiece 200 with a fastener of the other earpiece or detecting proximity degree of the fastener 230 of the earpiece 200 to the fastener of the other earpiece.

In an embodiment, the memory 260 may store one or more programs executed by the processor 290. In an embodiment, the memory 260 may temporarily store data (e.g., audio data and the like). In an embodiment, the memory 260 may store one or more application modules and the like.

In an embodiment, the audio processor 270 may convert (e.g., decode) a digital audio signal corresponding to audio data received from the electronic device (e.g., the electronic device 101 of FIG. 1) wirelessly or by wire into an analog audio signal under the control of the processor 290. The audio processor 270 may transmit the converted analog audio signal to the speaker 271. In an embodiment, the audio processor 270 may convert an audio signal such as a voice received from a microphone 273 into a digital audio signal and transmit the digital audio signal to the processor 290.

In an embodiment, the speaker 271 may output audio data received from the wireless communicator 210 or stored in the memory 260. In an embodiment, the speaker 271 may output audio data related to various operations or functions performed by the earpiece 200.

In an embodiment, the microphone 273 may process an audio signal, such as a voice obtained from the outside, into electrical voice data. In an embodiment, the microphone 273 may remove noise generated in the process of obtaining the audio signal by using various noise reduction algorithms.

In an embodiment, the power supply 280 may supply power or electricity to each component by receiving the power from a battery 289 or an external device (e.g., the charging device) under the control of the processor 290. In an embodiment, the power supply 280 may include a booster circuit 281, a charging circuit 283, a battery level measurement circuit 285, a power management integrated circuit (PMIC) 287, and the battery 289.

In an embodiment, the booster circuit 281 may be connected to the battery 289 and may boost a voltage of the connected battery 289 and transfer the boosted voltage to the charging circuit 283.

In an embodiment, the charging circuit 283 may transfer a voltage received from the booster circuit 281 to the PMIC 287 or may transfer a voltage received from the external device (e.g., the charging device) to at least one of the battery 289 or the PMIC 287.

In an embodiment, the battery level measurement circuit 285 (e.g., a fuel gauge) may measure information on the battery 289. In an embodiment, the information on the battery 289 may include a remaining amount, voltage, current, or temperature of the battery 289. In an embodiment, the battery level measurement circuit 285 may measure the information on the battery 289 based on a signal received through an electrical path connected to the battery 289.

In an embodiment, the PMIC 287 may manage the power of the earpiece 200. For example, the PMIC 287 may adjust the power to be transferred to each component of the earpiece 200.

In an embodiment, the battery 289 may be charged by a wireless or wired charging method under the control of the PMIC 287. For example, the battery 289 may be charged by receiving the power from the electronic device (e.g., the electronic device 101 of FIG. 1) through a cable capable of connecting the earpiece 200 and the electronic device (e.g., the electronic device 101 of FIG. 1) by wire. In another example, the battery 289 may be charged by receiving the power from a charging device connected through the interface 220. In an embodiment, the battery 289 may include various types of batteries such as rechargeable batteries or solar cells.

In an embodiment, the processor 290 may control the overall operation of the earpiece 200. In an embodiment, the processor 290 may have the same or similar configuration as the processor 120 of the electronic device 101 of FIG. 1.

In an embodiment, the earpiece 200 may further include a housing for surrounding at least a portion of the wireless communicator 210, the interface 220, the fastener 230, the input device 240, the sensor 250, the memory 260, the audio processor 270, the power supply 280, and the processor 290, and a wearable portion for the earpiece 200 to be worn on the user's body.

Figure 3:
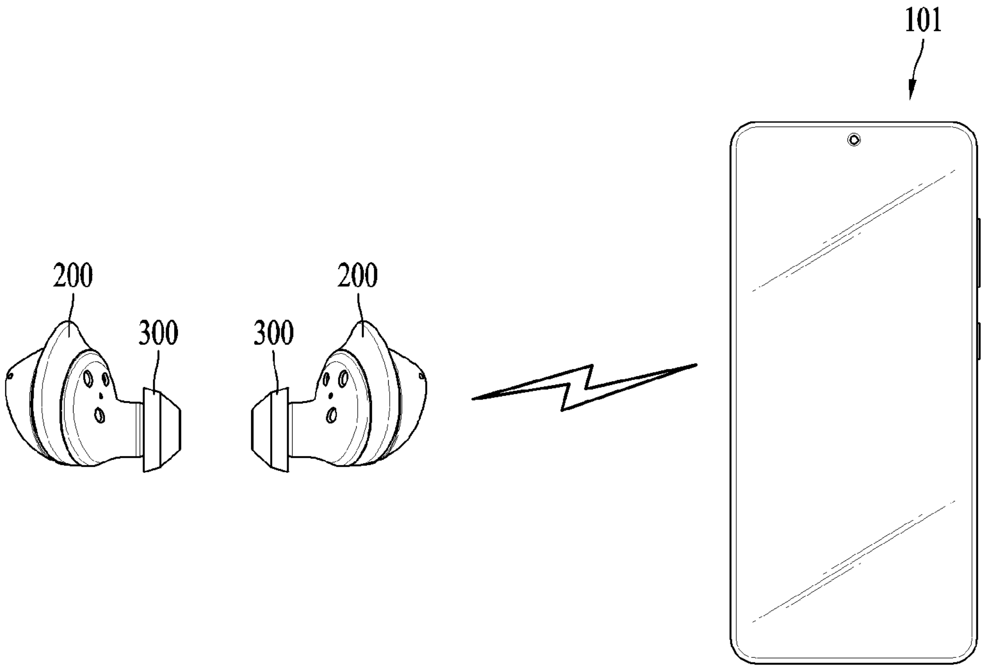
FIG. 3 is a diagram illustrating a configuration of a communication system of a wearable electronic device according to an embodiment.

FIG. 3 is a diagram illustrating a configuration of a communication system of a wearable electronic device according to an embodiment.

Referring to FIG. 3, the wearable electronic device according to an embodiment may include the earpiece 200 and an ear device 300. The electronic device 101 may transmit audio data to the wearable electronic device according to an embodiment by using a wireless communication method (or a wired communication method). For example, the electronic device 101 may transmit the audio data to at least one of the earpieces 200 using Bluetooth. Alternatively, when the electronic device 101 is connected to at least one of the earpieces 200 through a cable, the electronic device 101 may transmit the audio data to at least one of the earpieces 200 through the cable. The ear device 300 may be an ear tip coupled to the earpiece 200, and the user may insert the ear tip into the ear and receive a sound signal from the earpiece 200.

Figure 4A:
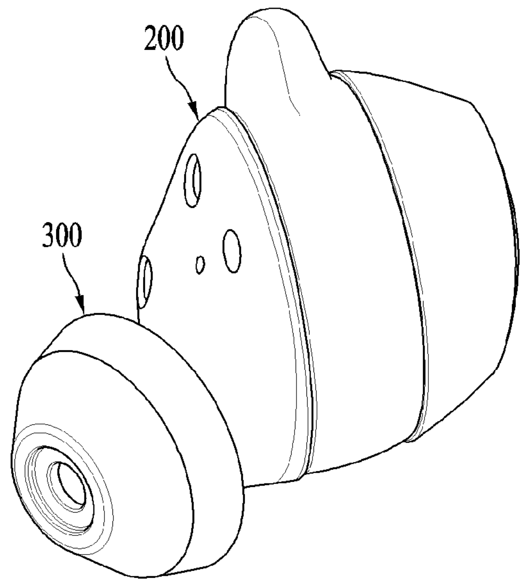
FIG. 4A is a perspective view of a wearable electronic device according to an embodiment.
Figure 4B:
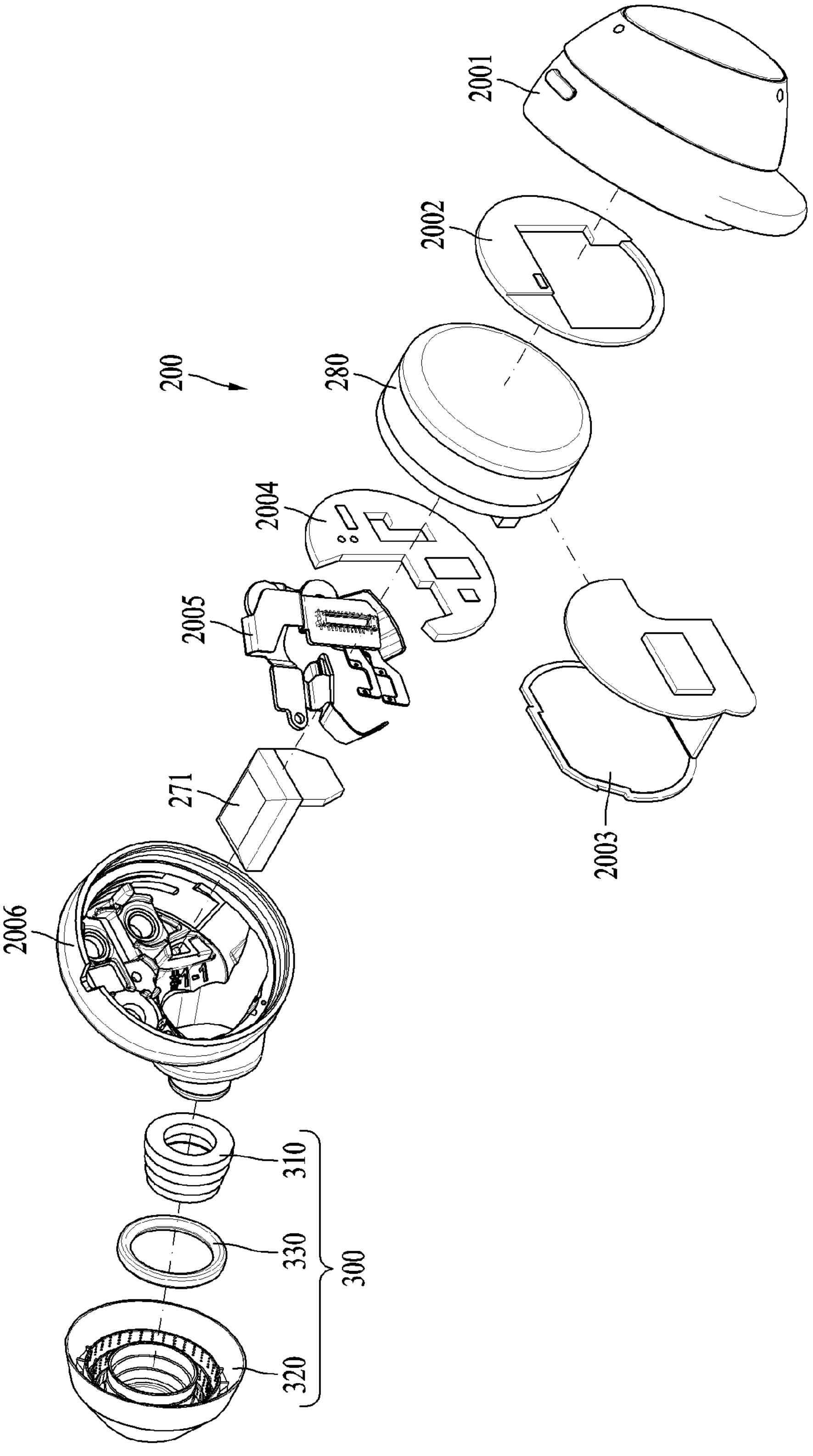
FIG. 4B is an exploded view of the wearable electronic device according to an embodiment.
Figure 4C:
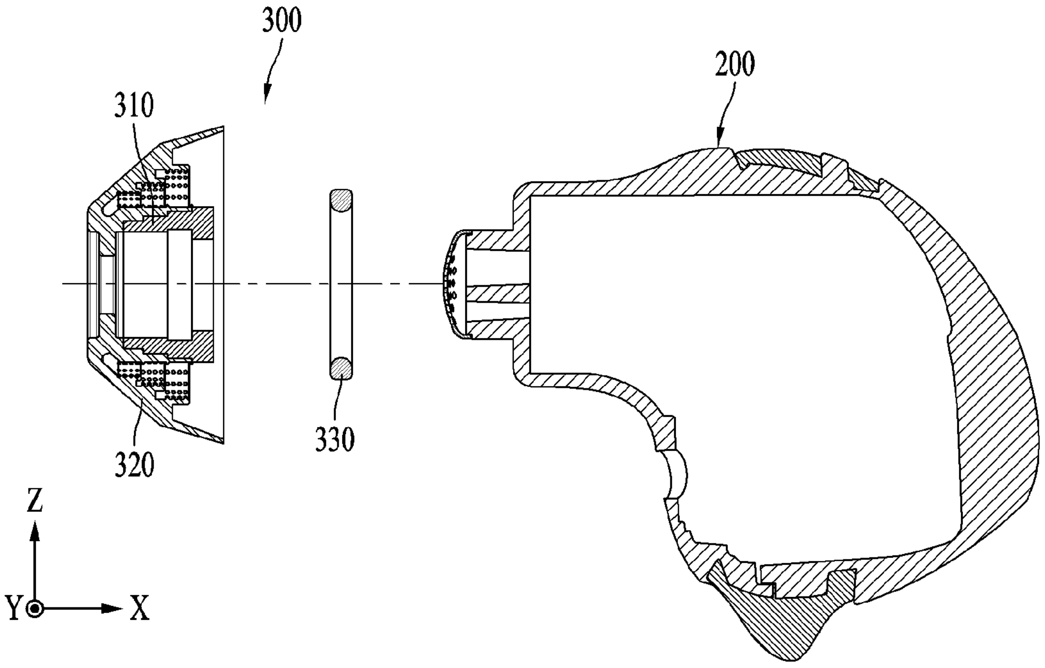
FIG. 4C is a cross-sectional view of the wearable electronic device according to an embodiment.

FIG. 4A is a perspective view of a wearable electronic device according to an embodiment, FIG. 4B is an exploded view of the wearable electronic device according to an embodiment, and FIG. 4C is a cross-sectional view of the wearable electronic device according to an embodiment.

Referring to FIGS. 4A to 4C, the ear device 300 of the wearable electronic device according to an embodiment may be an ear tip that may be coupled to a speaker (e.g., the speaker 271 of FIG. 2) side of the earpiece 200. Particularly, referring to FIG. 4B, the earpiece 200 may include a first case 2001 and a second case 2006 and may include a first bracket 2002, the power supply 280, a printed board assembly 2003, a second bracket 2004, a microphone flexible PCB (FPCB) 2005, and a speaker 271 in an inner space formed by the first case 2001 and the second case 2006. The first bracket 2002 and the second bracket 2004 may fix other components (e.g., the speaker 271) to the inner space, and components including a processor (e.g., the processor 290 of FIG. 2) or a memory (e.g., the memory 260 of FIG. 2) may be mounted on the printed board assembly 2003. A microphone (e.g., the microphone 273 of FIG. 2) may be mounted on the microphone FPCB 2005 and the microphone FPCB 2005 may be connected to the printed board assembly 2003. The speaker 271 may also be connected to the printed board assembly 2003. The ear device 300 may be coupled to an outer side of the second case 2006. For example, a second tip member 320 of the ear device 300 may be coupled onto a first tip member 310 of the ear device 300, a guide ring 330 of the ear device 300 may be inserted into the second tip member 320, and the first tip member 310 may be coupled to the second case 2006.

The ear canal of the user's ear has a complex shape, and thus, when the rigid earpiece 200 is inserted into the user's ear canal as it is, a pressure partially applied to the ear canal may induce pain. In contrast, the induced pain may be prevented as the ear device 300 having elasticity is coupled to an end portion of the earpiece 200. In addition, although a depth, width, angle, and the like of the ear canal may be different for each user, the user may stably wear the earpiece 200 through the movement of the guide ring 330 of the ear device 300 according to an embodiment in a front and back direction (e.g., a ±X direction in FIG. 4C). The ear device 300 according to an embodiment will be described in detail below.

Figure 5A:
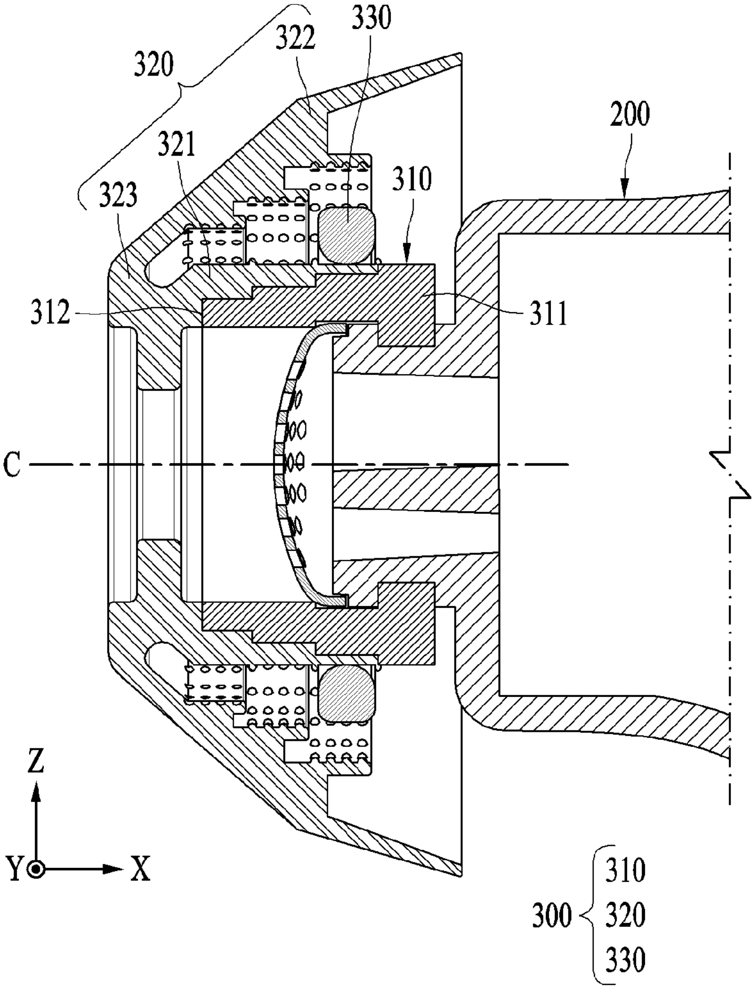
FIG. 5A is a diagram illustrating a cross-section of an ear device according to an embodiment, and FIG. 5B specifically illustrates a portion of the cross-section of the ear device according to an embodiment.
Figure 5B:
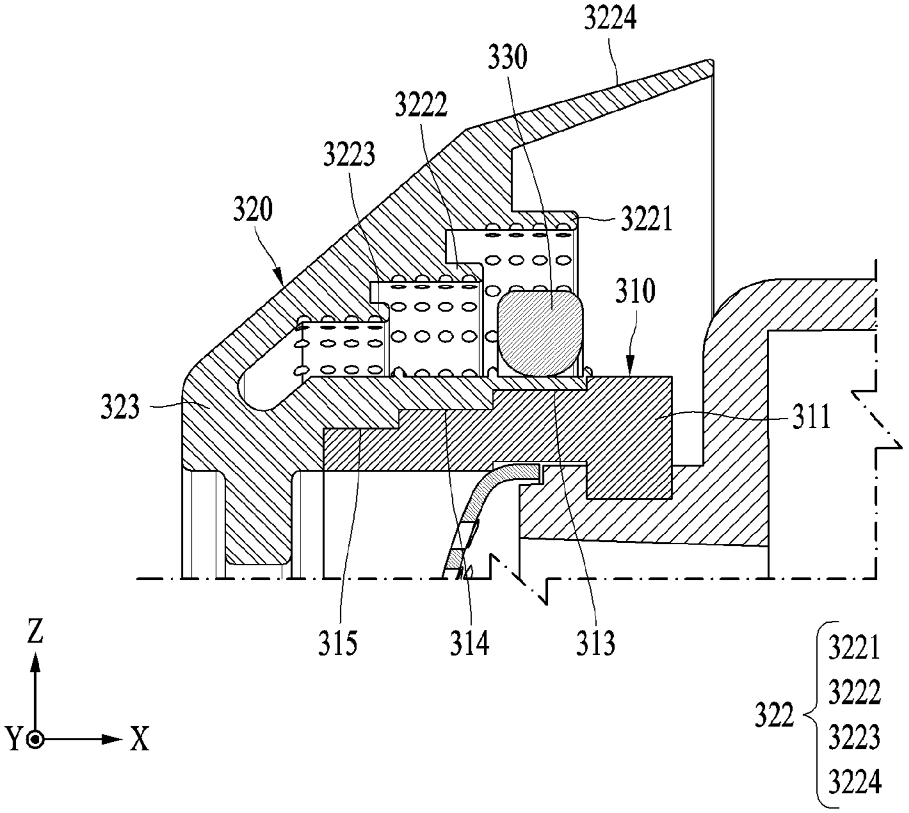

FIG. 5A is a diagram illustrating a cross-section of the ear device 300 according to an embodiment, and FIG. 5B specifically illustrates a portion of the cross-section of the ear device 300 according to an embodiment.

Referring to 5A and 5B, the ear device 300 according to an embodiment may include the first tip member 310, the second tip member 320 for surrounding at least a portion of the first tip member 310, and the guide ring 330 interposed between the first tip member 310 and at least a portion of the second tip member 320.

In an embodiment, the first tip member 310 may be formed of a first material, the second tip member 320 may be formed of a second material, and the guide ring 330 may be formed of a third material. A hardness of the first material may be greater than a hardness of the third material, and the hardness of the third material may be greater than a hardness of the second material. For example, the second tip member 320 that may directly come into contact with the user's body (e.g., the ear canal) may be formed of a soft material having excellent elasticity and a restoring force (e.g., a rubber or urethane material), and the first tip member 310 may be formed of a rigid material (e.g., a polycarbonate material). Since the first tip member 310 is formed of a rigid material, the first tip member 310 may firmly support the second tip member 320 even if the second tip member 320 is deformed.

In an embodiment, the first tip member 310 may have a cylindrical shape of which an outer diameter varies depending on a location on a central axis C thereof, and a first end portion 311 of the first tip member 310 may be connected to the earpiece 200. A second end portion 312 of the first tip member 310 positioned at a side opposite to the first end portion 311 may be positioned at a side of the first tip member 310 far from the earpiece 200. An outer diameter of the first tip member 310 in the second end portion 312 may be smaller than an outer diameter thereof in the first end portion 311. As used herein, the diameter is measured on a cross-sectional plane defined by the Y direction and Z direction.

In an example, the first tip member 310 may include a first stepped portion 313, a second stepped portion 314, and a third stepped portion 315. The first stepped portion 313, the second stepped portion 314, and the third stepped portion 315 may be disposed sequentially along a first direction (e.g., a −X direction in FIG. 5A) from the first end portion 311 toward the second end portion 312. An outer diameter of the second stepped portion 314 is smaller than an outer diameter of the first stepped portion 313, and an outer diameter of the third stepped portion 315 is smaller than the outer diameter of the second stepped portion 314. In another example, the outer diameter of the first tip member 310 may gradually decrease along the first direction (e.g., the −X direction in FIG. 5A).

In an embodiment, the second tip member 320 may include a first coupling element 321, a second coupling element 322, and a connection area 323. The first coupling element 321 may be coupled to an outer surface of the first tip member 310 while sharing a central axis C which is the same as a central axis of the first tip member 310. The first coupling element 321 may have a cylindrical shape, and an inner diameter thereof may decrease along the first direction (e.g., the −X direction in FIG. 5A). The inside of the first coupling element 321 may have a stepped shape corresponding to each of the shapes of the first stepped portion 313, the second stepped portion 314, and the third stepped portion 315.

In an embodiment, the first coupling element 321 may be formed of an elastic material and may be compressed toward the first tip member 310 by the pressure of the guide ring 330 placed thereon.

In an embodiment, at least a portion of the second coupling element 322 may be formed to be spaced apart from the first coupling element 321, and an end portion of the first coupling element 321 and an end portion of the second coupling element 322 may be coupled to each other in the connection area 323. For example, the connection area 323 may be at a position spaced apart from the earpiece 200 along the first direction (e.g., the −X direction in FIG. 5A). The first coupling element 321 and the second coupling element 322 may be formed of an elastic material, so that a position of at least a portion of the second coupling element 322 relative to the first coupling element 321 may vary along a third direction (e.g., a +Z direction in FIG. 5A) or a fourth direction (e.g., a −Z direction in FIG. 5A) perpendicular to the first direction.

In an embodiment, the second coupling element 322 may include an extension cap 3224, a first extension portion 3221, a second extension portion 3222, and a third extension portion 3223.

The extension cap 3224 may extend from an end portion of the second coupling element 322 positioned in the connection area 323 along a second direction (e.g., a +X direction in FIG. 5B) to be farther away from the central axis C. An outer surface of the extension cap 3224 is a portion that comes into contact with the user's ear and may be formed of an elastic material. In an embodiment, the outer surface of the extension cap 3224 may be inclined with respect to the central axis C and have a substantially conical shape.

The first extension portion 3221 may extend from the extension cap 3224 along the second direction (e.g., the −X direction in FIG. 5B) to be parallel to the central axis C. At least a portion of the first extension portion 3221 may be disposed in a corresponding area of the first stepped portion 313 that is spaced apart from the first stepped portion 313 in the third direction (e.g., the +Z direction in FIG. 5B).

The second extension portion 3222 may extend from the extension cap 3224 along the second direction to be parallel to the central axis C and may be disposed to be spaced apart from the first extension portion 3221. At least a portion of the second extension portion 3222 may be disposed in a corresponding area of the second stepped portion 314 that is spaced apart from the second stepped portion 314 in the third direction. In this case, an extended length of the second extension portion 3222 along the second direction may not reach an area where the first stepped portion 313 is positioned.

The third extension portion 3223 may extend from the extension cap 3224 along the second direction to be parallel to the central axis C and may be disposed to be spaced apart from the first extension portion 3221 or the second extension portion 3222. At least a portion of the third extension portion 3223 may be disposed in a corresponding area of the third stepped portion 315 that is spaced apart from the third stepped portion 315 in the third direction. In this case, an extended length of the third extension portion 3223 along the second direction may not reach an area where the second stepped portion 314 is positioned.

In an example, a distance from the central axis C to the first extension portion 3221 may be longer than a distance from the central axis C to the second extension portion 3222. The distance from the central axis C to the second extension portion 3222 may be longer than a distance from the central axis C to the third extension portion 3223.

In an example, the first extension portion 3221, the second extension portion 3222, or the third extension portion 3223 may have a cylindrical shape having the central axis C.

In an embodiment, the first tip member 310 and the second tip member 320 may be formed by double injection molding. For example, when the first tip member 310 is formed of the first material and the second tip member 320 is formed of the second material having a smaller hardness than the first material, the second material is applied to an outer surface of the first tip member 310 according to the shape of the second tip member 320 in a state where the shape of the first tip member 310 is formed first with the first material, thereby integrally forming the first tip member 310 and the second tip member 320 by the double injection molding. Alternatively, the first tip member 310 and the second tip member 320 may be formed by insert injection molding. For example, as the first tip member 310 is inserted into a mold and then the second material, which is a raw material of the second tip member 320, is filled in the mold, the first tip member 310 and the second tip member 320 may be integrally formed by the insert injection molding. In another example, the first tip member 310 and the second tip member 320 may be coupled through physical fastening.

In an embodiment, the guide ring 330 is a ring-shaped member disposed between the first coupling element 321 and the second coupling element 322, and may be formed of an elastic material. The guide ring 330 may be movable along the first direction or the second direction, and thus, the guide ring 330 may be disposed in one of areas where the first stepped portion 313, the second stepped portion 314, and the third stepped portion 315 are positioned.

Figure 6A:
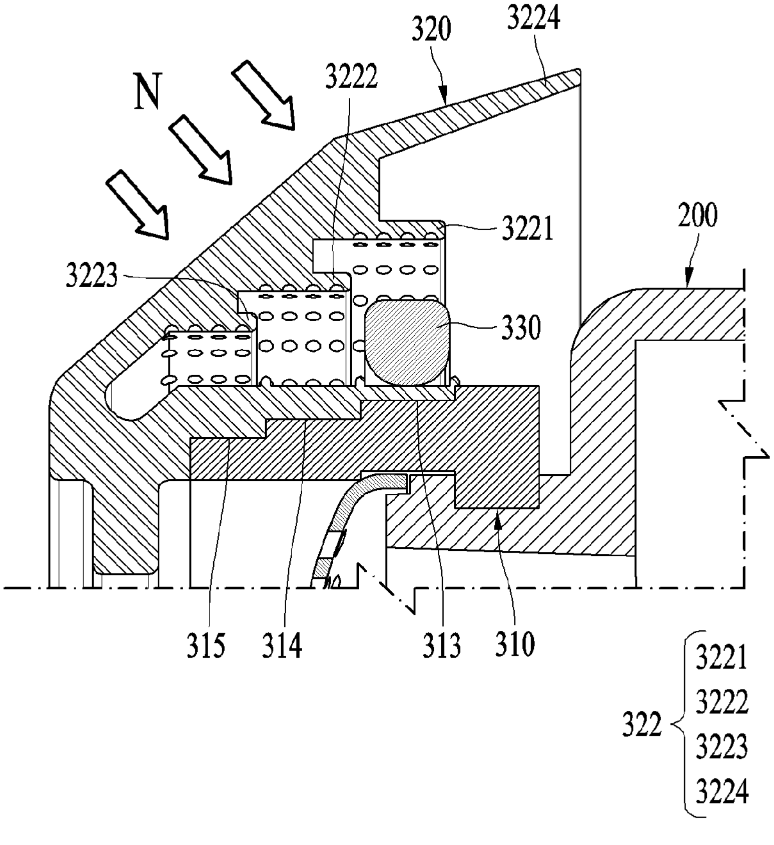
FIG. 6A illustrates a state before an external force is applied to an ear device according to an embodiment.
Figure 6B:
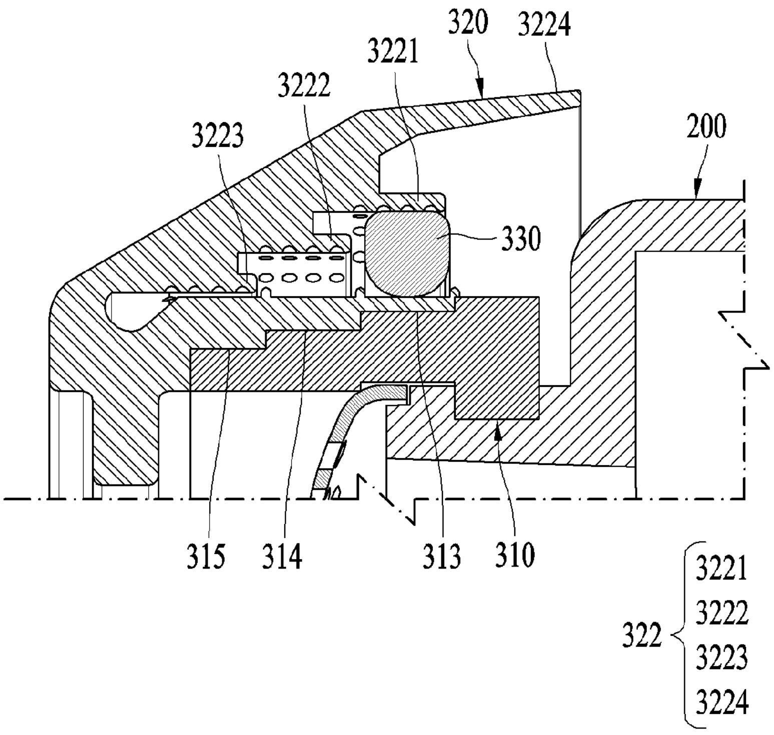
FIG. 6B illustrates a state after the external force is applied to the ear device according to an embodiment, and FIG. 6C specifically illustrates a cross-section of a guide ring of the ear device according to an embodiment.
Figure 6C:
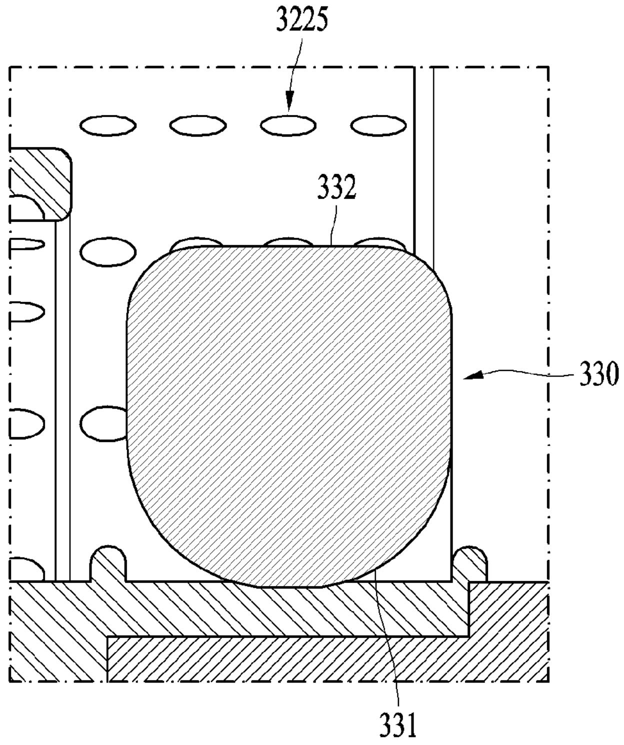

FIG. 6A illustrates a state before an external force N is applied to the ear device 300 according to an embodiment, and FIG. 6B illustrates a state after the external force N is applied to the ear device 300 according to an embodiment. FIG. 6C specifically illustrates a cross-section of the guide ring 330 of the ear device 300 according to an embodiment.

Referring to FIGS. 6A and 6B, the guide ring 330 may be disposed in one (e.g., an area where the first stepped portion 313 is positioned in FIG. 6A) of areas where the first stepped portion 313, the second stepped portion 314, and the third stepped portion 315 are positioned, and the second coupling element 322 of the second tip member 320 may be maintained to not come into contact with the guide ring 330 before the external force N is applied to the second tip member 320.

When the external force N is applied, the extension cap 3224 of the second tip member 320 may move toward the guide ring 330. For example, the external force N may be a force applied by contact between the ear device 300 according to an embodiment and a part of the user's body (e.g., a finger or ear canal).

The extension cap 3224 of the second tip member 320 may stop after one of the first extension portion 3221, the second extension portion 3222, and the third extension portion 3223 comes into contact with the guide ring 330, and the second tip member 320 may maintain its deformed shape as it is by a coupling force of the guide ring 330 and the one of the first extension portion 3221, the second extension portion 3222, and the third extension portion 3223. The coupling force may be formed by an adsorption force or adhesive force, which will be described in detail below with reference to FIG. 6C.

Referring to FIG. 6C, in an embodiment, the guide ring 330 may include a round section 331 and a flat section 332. For example, the round section 331 may be a section of at least a portion of an inner side surface of the guide ring 330 facing the first coupling element (e.g., the first coupling element 321 of FIG. 5A), and the round section 331 may have a cross-section with a round shape. The flat section 332 may be a section of at least a portion of an outer side surface of the guide ring 330 facing the second coupling element (e.g., the second coupling element 322 in FIG. 5A), and the flat section 332 may have a cross-section with a linear shape parallel to the first direction (e.g., the −X direction of FIG. 5A).

The guide ring 330 may easily slide on the first coupling element (e.g., the first coupling element 321 of FIG. 5A) by virtue of the round section 331. Since the round section 331 is formed to protrude convexly toward the first coupling element (e.g., the first coupling element 321 of FIG. 5A), the first coupling element 321 may be smoothly compressed by the pressure of the guide ring 330.

The guide ring 330 may be adsorbed with at least a portion of the second coupling element (e.g., the second coupling element 322 of FIG. 5A) facing the flat section 332 through the flat section 332, and may support the at least a portion of the second coupling element. For example, the flat section 332 may be formed by a surface treatment (e.g., a mirror surface finishing treatment). In an example, an adhesive for providing the coupling force may be applied onto the flat section 332.

In an embodiment, grooves 3225 may be formed (i.e., defined) on at least a portion of a surface of the first extension portion (e.g., the first extension portion 3221 of FIG. 5B) facing the first coupling element (e.g., the first coupling element 321 of FIG. 5A). For example, the grooves 3225 may come into contact with the flat section 332 of the guide ring 330, and a vacuum adsorption force may be generated between the flat section 332 and the first extension portion (e.g., the first extension portion 3221 of FIG. 5B) by the grooves 3225 after the external force N is applied. Therefore, one of the extension portions 3221, 3222, and 3223 may be deformed (hereinafter "coupled shape") as shown in FIGS. 6B and 7A to 7C while the external force N is applied so that the coupling force increases. Similarly, the grooves 3225 may be formed on at least a portion of a surface of the second extension portion (e.g., the second extension portion 3222 of FIG. 5B) facing the first coupling element (e.g., the first coupling element 321 of FIG. 5A), and the grooves 3225 may be formed on at least a portion of a surface of the third extension portion (e.g., the third extension portion 3223 of FIG. 5B) facing the first coupling element (e.g., the first coupling element 321 of FIG. 5A).

In an embodiment, an adhesive element may be applied to at least a portion of the surface of the first extension portion (e.g., the first extension portion 3221 of FIG. 5B) facing the first coupling element (e.g., the first coupling element 321 of FIG. 5A). In another embodiment, the grooves 3225 may be formed on at least a portion of the surface of the first extension portion (e.g., the first extension portion 3221 of FIG. 5B) facing the first coupling element (e.g., the first coupling element 321 of FIG. 5A), and the adhesive element may be applied to a surrounding portion of the grooves 3225. For example, when the adhesive element is applied to an area other than the grooves 3225, an additional coupling force may be provided by an adhesive material of the adhesive element.

Figure 7A:
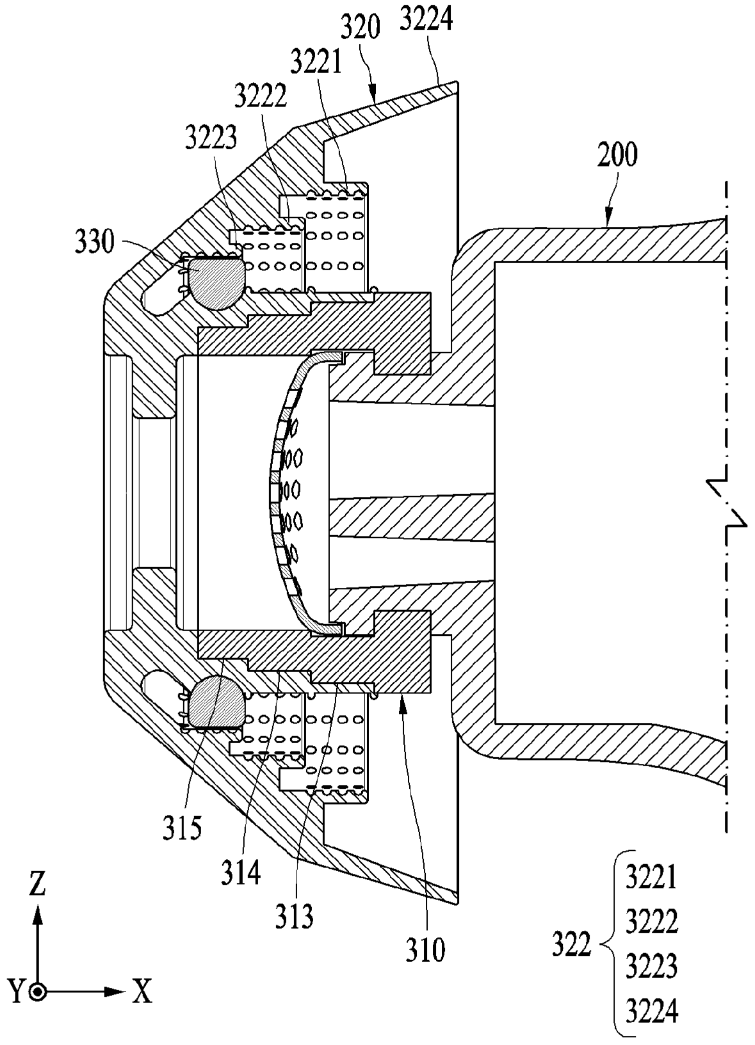
FIG. 7A illustrates an ear device according to an embodiment in a first state.
Figure 7B:
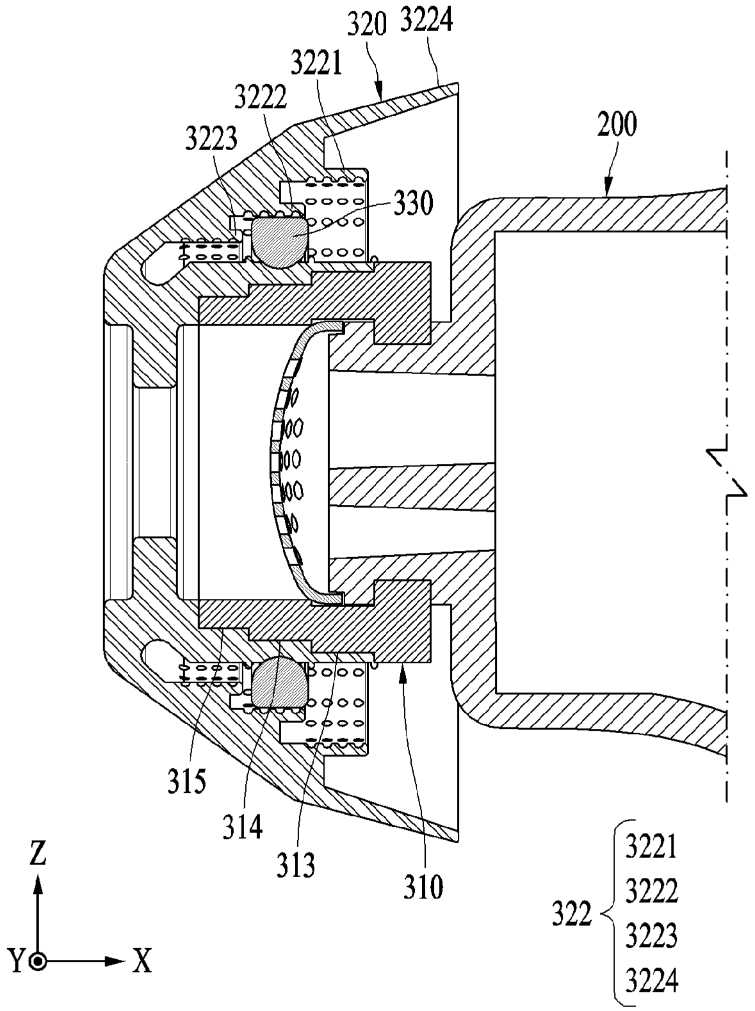
FIG. 7B illustrates the ear device according to an embodiment in a second state.
Figure 7C:
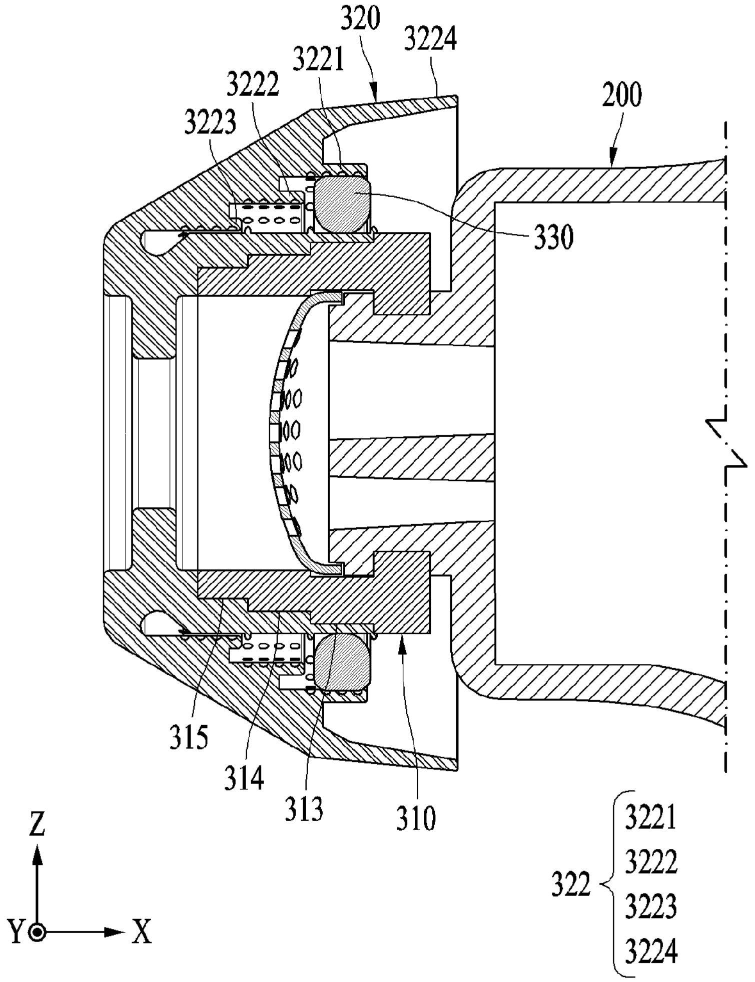
FIG. 7C illustrates the ear device according to an embodiment in a third state.

FIG. 7A to 7C illustrate a degree of deformation of the ear device 300 according to an embodiment.

Referring to FIG. 7A, in a first state in which the guide ring 330 is settled in an area where the third stepped portion 315 of the first tip member 310 is positioned, one side (e.g., the flat section 332 of FIG. 6C) of the guide ring 330 may come into contact with the third extension portion 3223 of the second tip member 320 and may maintain the coupled shape in the first state by a coupling force generated therebetween. At this time, the other side (e.g., the round section 331 of FIG. 6C) of the guide ring 330 may press the first coupling element (e.g., the first coupling element 321 of FIG. 5A) of the second tip member 320, and at least a portion of the first coupling element may be compressed by a stepped shape of the first tip member 310 coming into contact with the first coupling element.

Referring to FIG. 7B, in a second state in which the guide ring 330 is settled in an area where the second stepped portion 314 of the first tip member 310 is positioned, one side (e.g., the flat section 332 of FIG. 6C) of the guide ring 330 may come into contact with the second extension portion 3222 of the second tip member 320 and may maintain the coupled shape in the second state by a coupling force generated therebetween. The other side (e.g., the round section 331 of FIG. 6C) of the guide ring 330 may press the first coupling element (e.g., the first coupling element 321 of FIG. 5A) of the second tip member 320, and at least a portion of the first coupling element may be compressed by a stepped shape of the first tip member 310 coming into contact with the first coupling element.

Referring to FIG. 7C, in a third state in which the guide ring 330 is settled in an area where the first stepped portion 313 of the first tip member 310 is positioned, one side (e.g., the flat section 332 of FIG. 6C) of the guide ring 330 may come into contact with the first extension portion 3221 of the second tip member 320 and may maintain the coupled shape in the third state by a coupling force generated therebetween. The other side (e.g., the round section 331 of FIG. 6C) of the guide ring 330 may press the first coupling element (e.g., the first coupling element 321 of FIG. 5A) of the second tip member 320 and at least a portion of the first coupling element may be compressed by a stepped shape of the first tip member 310 coming into contact with the first coupling element.

Referring to FIGS. 7A to 7C, a compression amount of the first coupling element in the first state shown in FIG. 7A may be greater than a compression amount of the first coupling element in the second state shown in FIG. 7B, and the compression amount of the first coupling element in the second state shown in FIG. 7B may be greater than a compression amount of the first coupling element in the third state shown in FIG. 7C. This is because the first tip member 310 has a stepped shape and the first coupling element 321 also have a complementary stepped shape with respect to the stepped shape of the first tip member 310 (i.e., a distance between an outer surface and an inner surface of a section of the first coupling element 321 facing the third stepped portion 315 is greater than a distance between an outer surface and an inner surface of a section of the first coupling element 321 facing the second stepped portion 314, and the distance between the outer surface and the inner surface of the section of the first coupling element 321 facing the second stepped portion 314 is greater than a distance between an outer surface and an inner surface of a section of the first coupling element 321 facing the first stepped portion 313), and thus, a height of the guide ring 330 for each section (for example, a distance from a central axis (e.g., the central axis C of FIG. 5A)) may be changed due to a difference in the compression amount of the first coupling element 321 for each section. For example, the height of the guide ring 330 in FIG. 7A is lower than the height of the guide ring 330 in FIG. 7B, and the height of the guide ring 330 in FIG. 7B is lower than the height of the guide ring 330 in FIG. 7C. An abrupt height change of the second coupling element 322 is reduced when the guide ring 330 is coupled to the first extension portion 3221, the second extension portion 3222, or the third extension portion 3223 of the second tip member 320 by changing the height of the flat section 332, thereby gently adjusting a change in a size of the ear device 300 for each step. For example, referring to FIG. 7A, if the first tip member 310 has no stepped shape and the first coupling element 321 have no complementary stepped shape thereof, the guide ring 330 is disposed at a position higher than the height of the guide ring 330 in the first state of FIG. 7A. Accordingly, the second tip member 320 may have a shape expanded outward more abruptly than the shape in the first state of FIG. 7A. The stepped shape of the first tip member 310 may prevent such an abrupt height change, and as a result, the ear device 300 according to an embodiment may implement a relatively uniform and gradual shape change.

Figure 8:
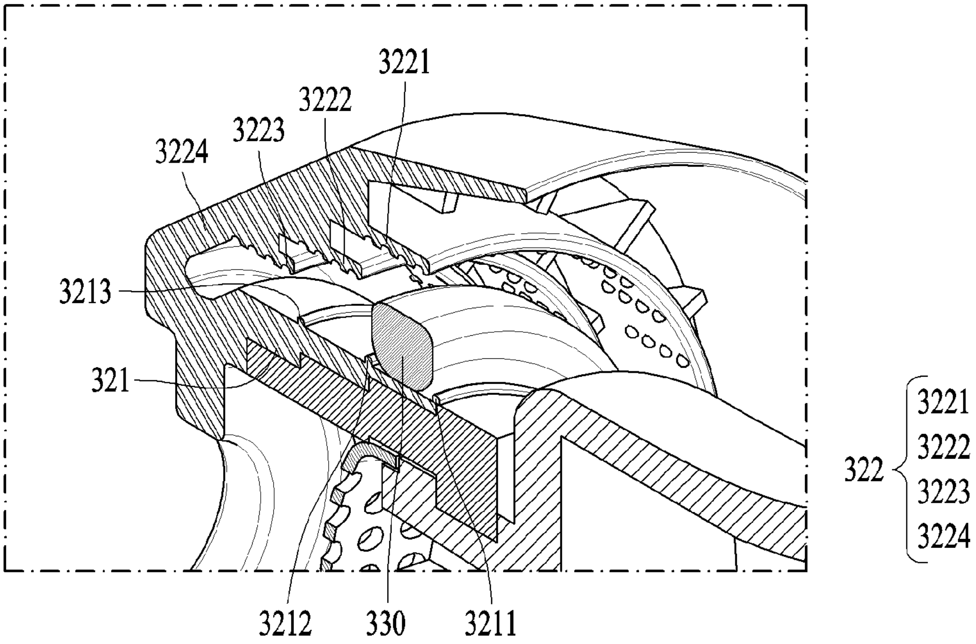
FIG. 8 is a diagram illustrating a portion of an ear device according to an embodiment.

FIG. 8 is a diagram illustrating a portion of the ear device 300 according to an embodiment.

Referring to FIG. 8, the ear device 300 according to an embodiment may include a slip prevention rib. The slip prevention rib may be formed to protrude toward the second coupling element 322 from at least a portion of a surface of the first coupling element 321 facing the second coupling element 322. The slip prevention rib may limit the position of the guide ring 330 and prevent the slipping of the guide ring 330 in the first or second direction, especially, while the external force N is applied, and the user may intuitively recognize the position of the guide ring 330 by the slip prevention rib.

The slip prevention rib may be provided in plurality, and for example, a first slip prevention rib 3211, a second slip prevention rib 3212, and a third slip prevention rib 3213 may be formed sequentially from the earpiece (e.g., the earpiece 200 of FIG. 5A). For example, the first slip prevention rib 3211, the second slip prevention rib 3212, and the third slip prevention rib 3213 may be disposed to be spaced apart from each other at regular intervals.

For example, the first slip prevention rib 3211 may be formed in an area corresponding to one end of the first extension portion 3221 or one end of the first stepped portion (e.g., the first stepped portion 313 of FIG. 5B) close to the first end portion 311, and the second slip prevention rib 3212 may be formed in an area corresponding to the other end of the first extension portion 3221 or the other end of the first stepped portion (e.g., the first stepped portion 313 of FIG. 5B). Similarly, the third slip prevention rib 3213 may be formed in an area corresponding to one end of the second extension portion 3222 or one end of the second stepped portion (e.g., the second stepped portion 314 of FIG. 5B) close to the second end portion 312.

Figure 9:
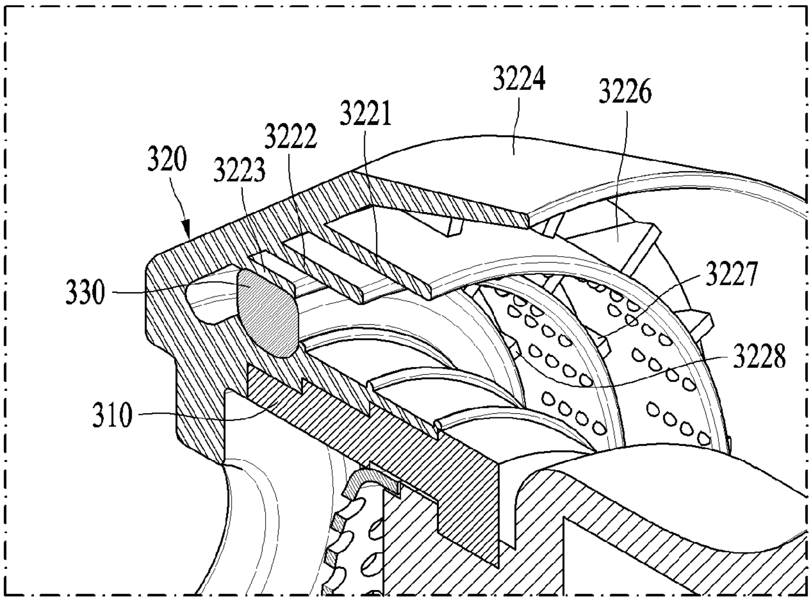
FIG. 9 is a diagram illustrating a portion of an ear device according to an embodiment.

FIG. 9 is a diagram illustrating a portion of the ear device 300 according to an embodiment.

Referring to FIG. 9, the ear device 300 according to an embodiment may further include a support rib. The support rib may connect and support each component of the second tip member 320.

For example, the support rib may be provided in plurality, a first support rib 3226 may connect the first extension portion (e.g., the first extension portion 3221 of FIG. 5B) of the second tip member 320 to the extension cap (e.g., the extension cap 3224 of FIG. 5B) and support the first extension portion and the extension cap, and a second support rib 3227 may connect the second extension portion (e.g., the second extension portion 3222 of FIG. 5B) of the second tip member 320 to the first extension portion (e.g., the first extension portion 3221 of FIG. 5B) and support the second extension portion and the first extension portion. The third support rib 3228 may connect the third extension portion (e.g., the third extension portion 3223 of FIG. 5B) to the second extension portion (e.g., the second extension portion 3222 of FIG. 5B) and support the third extension portion and the second extension portion.

Figure 10:
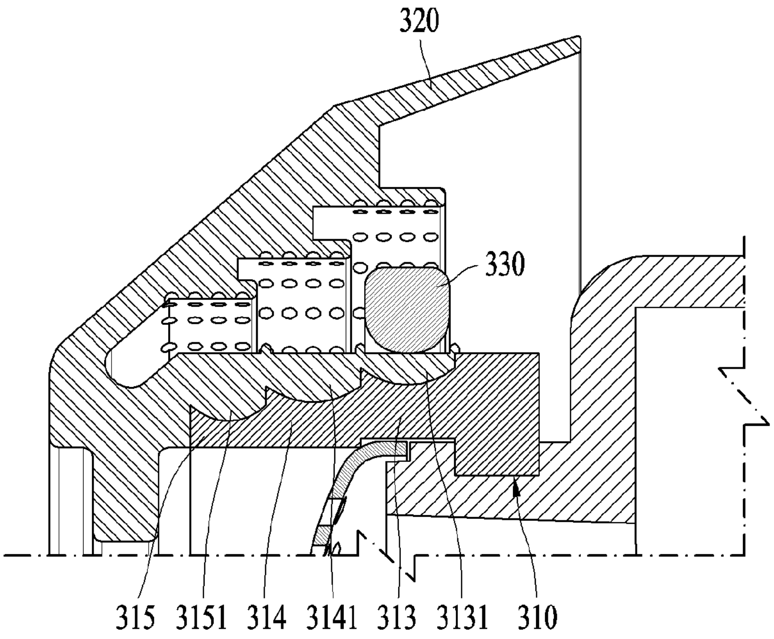
FIG. 10 illustrates a modification example of an ear device according to an embodiment.

FIG. 10 illustrates a modification example of the ear device 300 according to an embodiment.

Referring to FIG. 10, a plurality of recesses may be formed (i.e., defined) in the first tip member 310, different from the embodiment in FIG. 5B. The recesses may be formed on an outer side of the first tip member 310 and may limit the position of the guide ring 330. The recesses may prevent the slipping of the guide ring 330 in the first or second direction, especially, while the external force N is applied, and the user may intuitively recognize the position of the guide ring 330 by the recesses.

For example, a first recess 3131, a second recess 3141, and a third recess 3151 may be sequentially formed from a location near the earpiece (e.g., the earpiece 200 of FIG. 5A) to the location far from the earpiece. The first recess 3131 may be concavely formed on an outer surface of the first stepped portion (e.g., the first stepped portion 313 of FIG.

5B), and the second recess 3141 may be concavely formed on an outer surface of the second stepped portion (e.g., the second stepped portion 314 of FIG. 5B). In addition, the third recess 3151 may be concavely formed on an outer surface of the third stepped portion (e.g., the third stepped portion 315 of FIG. 5B).

Figure 11A:
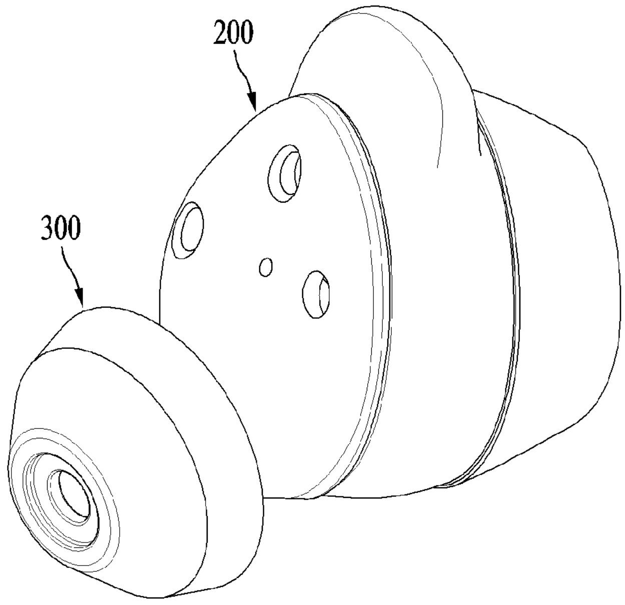
FIGS. 11A and 11B illustrate a use state of a wearable electronic device including an ear device according to an embodiment.
Figure 11B:
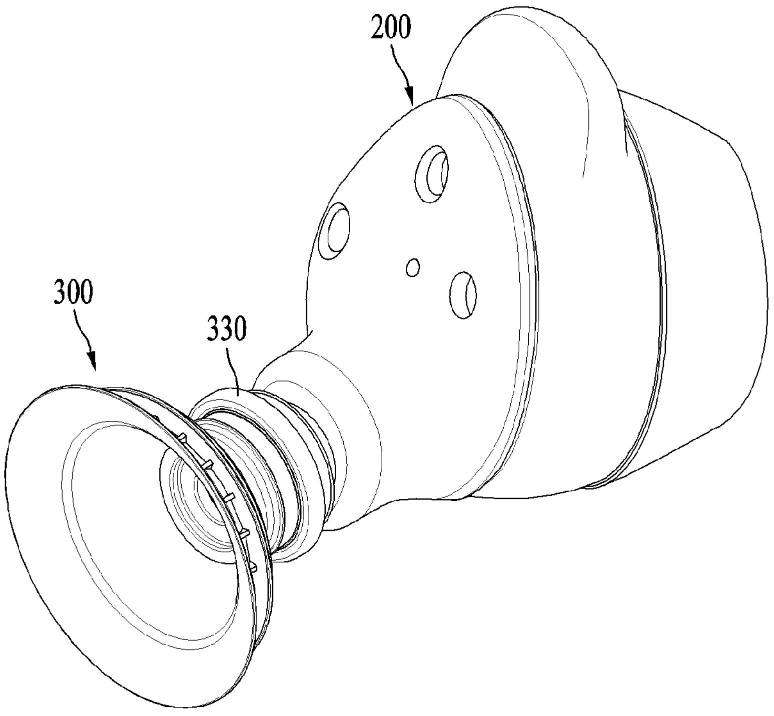

FIGS. 11A and 11B illustrate a use state of a wearable electronic device including the ear device 300 according to an embodiment. FIG. 11A shows a state before the wearable electronic device is adjusted to fit the user, and FIG. 11B shows a state in which the wearable electronic device is deformed to be adjusted to fit the user.

Referring to FIGS. 11A and 11B, in order to set the ear device 300 according to an embodiment to fit the user, first, the second coupling element (e.g., the second coupling element 322 of FIG. 5B) of the ear device 300 may be turned inside out to be farther away from the earpiece 200. Subsequently, the guide ring 330 may be moved and settled at a position suitable for the size of a part of the user's body (e.g., the ear canal). After the position of the guide ring 330 is adjusted, the second coupling element may be turned inside out toward the earpiece 200 and may return to its original position. After that, the guide ring 330 and the second coupling element may maintain a stably coupled shape by the external force.

Even though the embodiments in this application illustrate cases that the guide ring 330 have three possible positions, the invention is not limited thereto. In other embodiments, the shapes of elements in the ear device 300 may be configured to provide two possible positions or four or more possible positions.

A wearable electronic device according to an embodiment includes an earpiece 200 configured to convert an electrical signal into a sound signal, and an ear device 300 configured to be connected to the earpiece 200. The ear device 300 may include a first tip member 310 configured to be connected to the earpiece 200, a second tip member 320 configured to surround at least a portion of the first tip member 310, and a guide ring 330 configured to be interposed between at least a portion of the first tip member 310 and at least a portion of the second tip member 320, the guide ring 330 may be formed of an elastic material and may be movable between a first end portion 311 of the first tip member 310 connected to the earpiece 200 and a second end portion 312 of the first tip member 310 opposite to the first end portion 311, an outer diameter of the first tip member 310 may decrease from the first end portion 311 toward the second end portion 312, and the first tip member 310 may be formed of a material having a greater hardness than the guide ring 330, and the guide ring 330 may be formed of a material having a greater hardness than the second tip member 320.

An ear device 300 according to an embodiment includes a first tip member 310 including a first end portion 311 configured to connected to an earpiece 200 configured to convert an electrical signal into a sound signal, a second tip member 320 configured to surround at least a portion of the first tip member 310, and a guide ring 330 interposed between at least a portion of the first tip member 310 and at least a portion of the second tip member 320. The guide ring 330 may be formed of an elastic material and may be movable between the first end portion 311 of the first tip member 310 and a second end portion 312 of the first tip member 310 opposite to the first end portion 311.

In an embodiment, the first tip member 310 may have a cylindrical shape, and an outer diameter of the first tip member 310 may decrease from the first end portion 311 toward the second end portion 312.

In an embodiment, the first tip member 310 may include a first stepped portion 313 adjacent to the first end portion 311 and having an outer diameter smaller than an outer diameter of the first end portion 311, and a second stepped portion 314 adjacent to the first stepped portion 313 in a first direction from the first end portion 311 toward the second end portion 312, and having an outer diameter smaller than the outer diameter of the first stepped portion 313.

In an embodiment, the first tip member 310 may be formed of a first material, the second tip member 320 may be formed of a second material, the guide ring 330 may be formed of a third material, and a hardness of the first material may be greater than a hardness of the third material, or the hardness of the third material may be greater than a hardness of the second material.

In an embodiment, the second tip member 320 may include a first coupling element 321 configured to share a central axis C that is the same as a central axis of the first tip member 310 and come into contact with at least a portion of the first tip member 310; a second coupling element 322, at least a portion of which is spaced apart from the first coupling element 321; and a connection area 323 in which an end portion of the first coupling element 321 and an end portion of the second coupling element 322 may be connected to each other, where the connection area 323 is adjacent to the second end portion 312 of the first tip member 310, and the guide ring 330 may be disposed between the first coupling element 321 and the second coupling element 322.

In an embodiment, the second coupling element 322 may include an extension cap 3224 extending from the end portion of the second coupling element 322 along a direction inclined to the central axis C and being farther away from the central axis C along a second direction (+X direction in FIG. 5B) that is opposite to the first direction, a first extension portion 3221 extending from the extension cap 3224 along the second direction to be parallel to the central axis C, and a second extension portion 3222 extending from the extension cap 3224 along the second direction to be parallel to the central axis C and spaced apart from the first extension portion 3221, and the first extension portion 3221 or the second extension portion 3222 may have a cylindrical shape.

In an embodiment, the first extension portion 3221 may be disposed to be spaced apart from the first stepped portion 313 in a direction perpendicular to the first direction, and the second extension portion 3222 may be disposed to be spaced apart from the second stepped portion 314 in the direction perpendicular to the first direction.

In an embodiment, a distance between the first extension portion 3221 and the central axis C may be longer than a distance between the second extension portion 3222 and the central axis C.

In an embodiment, grooves 3225 may be formed (i.e., defined) on or an adhesive element may be applied to at least a portion of a surface of the first extension portion 3221 facing the first coupling element 321 or at least a portion of a surface of the second extension portion 3222 facing the first coupling element 321.

In an embodiment, the second coupling element 322 may further include a support rib, and the support rib may include a first support rib 3226 connecting the first extension portion 3221 to the extension cap 3224, and a second support rib 3227 connecting the second extension portion 3222 to the first extension portion 3221.

In an embodiment, a slip prevention rib 3211, 3212, and 3213 protruding toward the second coupling element 322 may be formed on at least a portion of a surface of the first coupling element 321 facing the second coupling element 322.

In an embodiment, the slip prevention rib may be provided in plurality, and the plurality of slip prevention ribs may be disposed to be spaced apart from each other along the first direction at regular intervals.

In an embodiment, at least a portion of an inner side surface of the guide ring 330 facing the first coupling element 321 may have a round section 331, and at least a portion of an outer side surface of the guide ring 330 facing the second coupling element 322 may have a flat section 332.

According to an embodiment, an ear device 300 includes a first tip member 310, a second tip member 320 configured to surround at least a portion of the first tip member 310, and a guide ring 330 movably positioned between the first tip member 310 and the second tip member 320 and configured to move a partial area of the second tip member 320 in a direction away from or a direction toward the first tip member 310. An outer diameter of the first tip member 310 may vary along a first direction (e.g., a −X direction in FIG. 5A) perpendicular to a direction in which the second tip member 320 is disposed on the first tip member 310.

In an embodiment, the first tip member 310 may include a first stepped portion 313 with a cylindrical shape that is adjacent to a first end portion 311 of the first tip member 310 and has an outer diameter smaller than an outer diameter of the first end portion 311, and a second stepped portion 314 with a cylindrical shape that is adjacent to the first stepped portion 313 along the first direction and has an outer diameter smaller than the outer diameter of the first stepped portion 313.

In an embodiment, a recess 3131 may be formed (i.e., defined) on an outer surface of the first stepped portion 313 or a recess 3141 may be formed on an outer surface of the second stepped portion 314.

In an embodiment, the second tip member 320 may include a first coupling element 321 configured to share a central axis C that is the same as a central axis of the first tip member 310 and come into contact with at least a portion of an outer side of the first tip member 310; a second coupling element 322, at least a portion of which is spaced apart from the first coupling element 321; and a connection area 323 in which an end portion of the first coupling element 321 and an end portion of the second coupling element 322 may be connected to each other, where the connection area 323 is away from the first end portion 311 of the first tip member 310, and the guide ring 330 may be disposed between the first coupling element 321 and the second coupling element 322.

In an embodiment, at least a portion of an inner side surface of the guide ring 330 facing the first coupling element 321 may have a round section 331, and at least a portion of an outer side surface of the guide ring 330 facing the second coupling element 322 may have a flat section 332.

In an embodiment, the first tip member 310 and the second tip member 320 may be formed by double injection molding, and the first tip member 310 may be formed of a material having a greater hardness than the second tip member 320.

What is claimed is:

1. A wearable electronic device comprising:

an earpiece configured to convert an electrical signal into a sound signal; and an ear device configured to be connected to the earpiece, wherein the ear device comprises:

a first tip member configured to be connected to the earpiece;

a second tip member configured to surround at least a portion of the first tip member; and a guide ring configured to be interposed between at least a portion of the first tip member and at least a portion of the second tip member, wherein the guide ring is formed of an elastic material and is movable between a first end portion of the first tip member connected to the earpiece and a second end portion of the first tip member opposite to the first end portion, wherein an outer diameter of the first tip member decreases from the first end portion toward the second end portion, and wherein the first tip member is formed of a material having a greater hardness than the guide ring, and the guide ring is formed of a material having a greater hardness than the second tip member.

2. An ear device comprising:

a first tip member comprising a first end portion configured to be connected to an earpiece configured to convert an electrical signal into a sound signal;

a second tip member configured to surround at least a portion of the first tip member; and a guide ring interposed between at least a portion of the first tip member and at least a portion of the second tip member, wherein the guide ring is formed of an elastic material and is movable between the first end portion of the first tip member and a second end portion of the first tip member opposite to the first end portion.

3. The ear device of claim 2, wherein the first tip member has a cylindrical shape, and wherein an outer diameter of the first tip member decreases from the first end portion toward the second end portion.

4. The ear device of claim 2, wherein the first tip member comprises:

a first stepped portion adjacent to the first end portion and having an outer diameter smaller than an outer diameter of the first end portion; and a second stepped portion adjacent to the first stepped portion in a first direction from the first end portion toward the second end portion, and having an outer diameter smaller than the outer diameter of the first stepped portion.

5. The ear device of claim 2, wherein the first tip member is formed of a first material, wherein the second tip member is formed of a second material, wherein the guide ring is formed of a third material, and wherein a hardness of the first material is greater than a hardness of the third material, or the hardness of the third material is greater than a hardness of the second material.

6. The ear device of claim 4, wherein the second tip member comprises:

a first coupling element configured to share a central axis that is the same as a central axis of the first tip member and come into contact with at least a portion of the first tip member;

a second coupling element, at least a portion of which is spaced apart from the first coupling element; and a connection area in which an end portion of the first coupling element and an end portion of the second coupling element are connected to each other, wherein the connection area is adjacent to the second end portion of the first tip member, and the guide ring is disposed between the first coupling element and the second coupling element.

7. The ear device of claim 6, wherein the second coupling element comprises:

an extension cap extending from the end portion of the second coupling element along a direction inclined to the central axis and being farther away from the central axis along a second direction that is opposite to the first direction;

a first extension portion extending from the extension cap along the second direction to be parallel to the central axis; and a second extension portion extending from the extension cap along the second direction and spaced apart from the first extension portion, and wherein the first extension portion or the second extension portion has a cylindrical shape.

8. The ear device of claim 7, wherein the first extension portion is disposed to be spaced apart from the first stepped portion in a direction perpendicular to the first direction, and wherein the second extension portion is disposed to be spaced apart from the second stepped portion in the direction perpendicular to the first direction.

9. The ear device of claim 7, wherein a distance between the first extension portion and the central axis is longer than a distance between the second extension portion and the central axis.

10. The ear device of claim 7, wherein grooves are formed on or an adhesive element is applied to at least a portion of a surface of the first extension portion facing the first coupling element or at least a portion of a surface of the second extension portion facing the first coupling element.

11. The ear device of claim 7, wherein the second coupling element further comprises support ribs, and wherein the support ribs comprise:

a first support rib connecting the first extension portion to the extension cap; and a second support rib connecting the second extension portion to the first extension portion.

12. The ear device of claim 6, wherein a slip prevention rib protruding toward the second coupling element is formed on at least a portion of a surface of the first coupling element facing the second coupling element.

13. The ear device of claim 12, wherein the slip prevention rib is provided in plurality, and the plurality of slip prevention ribs are disposed to be spaced apart from each other along the first direction at regular intervals.

14. The ear device of claim 6, wherein at least a portion of an inner side surface of the guide ring facing the first coupling element has a round section, and wherein at least a portion of an outer side surface of the guide ring facing the second coupling element has a flat section.

15. An ear device comprising:

a first tip member;

a second tip member configured to surround at least a portion of the first tip member; and a guide ring movably positioned between the first tip member and the second tip member and configured to move a partial area of the second tip member in a direction away from or a direction toward the first tip member, wherein an outer diameter of the first tip member varies along a first direction perpendicular to a direction in which the second tip member is disposed on the first tip member.

16. The ear device of claim 15, wherein the first tip member comprises:

a first stepped portion with a cylindrical shape that is adjacent to a first end portion of the first tip member and has an outer diameter smaller than an outer diameter of the first end portion; and a second stepped portion with a cylindrical shape that is adjacent to the first stepped portion along the first direction and has an outer diameter smaller than the outer diameter of the first stepped portion.

17. The ear device of claim 16, wherein a first recess is formed on an outer surface of the first stepped portion or a second recess is formed on an outer surface of the second stepped portion.

18. The ear device of claim 16, wherein the second tip member comprises:

a first coupling element configured to share a central axis that is the same as a central axis of the first tip member and come into contact with at least a portion of an outer side of the first tip member;

a second coupling element, at least a portion of which is spaced apart from the first coupling element; and a connection area in which an end portion of the first coupling element and an end portion of the second coupling element are connected to each other, wherein the connection area is away from the first end portion of the first tip member, and the guide ring is disposed between the first coupling element and the second coupling element.

19. The ear device of claim 18, wherein at least a portion of an inner side surface of the guide ring facing the first coupling element has a round section, and wherein at least a portion of an outer side surface of the guide ring facing the second coupling element has a flat section.

20. The ear device of claim 15, wherein the first tip member is formed of a material having a greater hardness than the second tip member.

21. The ear device of claim 18, wherein the first coupling element of the second tip member includes a first section in contact with the first stepped portion and a second section in contact with the second stepped portion, the partial area includes the first section or the second section, and a moving amount of the first section is smaller than a moving amount of the section section.

22. The ear device of claim 6, wherein the first coupling element of the second tip member includes a first section in contact with the first stepped portion and a second section in contact with the second stepped portion, and a distance between an outer surface and an inner surface of the first section has smaller than a distance between an outer surface and an inner surface of the second section.

* * * * *